(12) United States Patent
Ma

(10) Patent No.: US 9,954,969 B2
(45) Date of Patent: Apr. 24, 2018

(54) MULTIMEDIA GENERATING METHOD AND RELATED COMPUTER PROGRAM PRODUCT

(71) Applicant: REALTEK SEMICONDUCTOR CORPORATION, Hsinchu (TW)

(72) Inventor: Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 213 days.

(21) Appl. No.: 14/953,207

(22) Filed: Nov. 27, 2015

(65) Prior Publication Data

US 2016/0080516 A1 Mar. 17, 2016

Related U.S. Application Data

(62) Division of application No. 13/627,676, filed on Sep. 26, 2012, now Pat. No. 9,258,380.

(Continued)

(30) Foreign Application Priority Data

Aug. 24, 2012 (TW) .............................. 101130868 A

(51) Int. Cl.
*H04L 29/08* (2006.01)
*H04L 29/06* (2006.01)
*H04W 4/18* (2009.01)

(52) U.S. Cl.
CPC ........ *H04L 67/2823* (2013.01); *H04L 65/605* (2013.01); *H04L 67/10* (2013.01);
(Continued)

(58) Field of Classification Search
CPC combination set(s) only.
See application file for complete search history.

(56) References Cited

U.S. PATENT DOCUMENTS 6,211,782 B1 * 4/2001 Sandelman .......... F24F 11/0086
340/12.53
6,809,724 B1 10/2004 Shiraishi et al.
(Continued)

FOREIGN PATENT DOCUMENTS

CN 1355495 A 6/2002
CN 1504922 A 6/2004
(Continued)

*Primary Examiner* — Saket K Daftuar
(74) *Attorney, Agent, or Firm* — Birch, Stewart, Kolasch & Birch, LLP

(57) ABSTRACT

A multimedia generating method for use in a target electronic device includes: communicating the target electronic device with a central relay server (CRS) via internet to conduct an identity authentication; receiving an activation command from the CRS via internet; after receiving the activation command, activating a websocket server module in the target electronic device to establish one or more network sockets between the target electronic device and other electronic devices, so that the target electronic device and other electronic devices communicate control parameters via the websocket server module; generating one or more corresponding images according to control parameters received from other electronic devices; and displaying the one or more images on a display of the target electronic device.

3 Claims, 6 Drawing Sheets

Related U.S. Application Data

(60) Provisional application No. 61/605,771, filed on Mar. 2, 2012.

(52) U.S. Cl.
CPC ........ *H04L 67/148* (2013.01); *H04L 67/2814* (2013.01); *H04W 4/18* (2013.01); *H04L 67/289* (2013.01)

(56) References Cited

U.S. PATENT DOCUMENTS

| | | | |
|---|---|---|---|
| 7,667,646 B2 | 2/2010 | Kalliola et al. | |
| 8,147,336 B2 | 4/2012 | Hirota | |
| 8,744,410 B2* | 6/2014 | Krefft | H04W 4/001 455/411 |
| 8,825,816 B2* | 9/2014 | Deutsch | H04L 29/12367 709/220 |
| 8,849,945 B1 | 9/2014 | Desjardins et al. | |
| 8,863,237 B2* | 10/2014 | Pahlavan | G06F 9/4445 709/203 |
| 8,869,239 B2* | 10/2014 | Pahlavan | G06F 9/4445 709/219 |
| 9,052,802 B2 | 6/2015 | Yu et al. | |
| 9,104,367 B2 | 8/2015 | Yu et al. | |
| 9,105,221 B2 | 8/2015 | Yu et al. | |
| 9,106,696 B2* | 8/2015 | Pahlavan | G06F 9/4445 |
| 9,185,171 B2* | 11/2015 | Pahlavan | G06F 9/4445 |
| 9,185,172 B2* | 11/2015 | Pahlavan | G06F 9/4445 |
| 9,191,448 B2* | 11/2015 | Pahlavan | G06F 9/4445 |
| 9,191,449 B2* | 11/2015 | Pahlavan | G06F 9/4445 |
| 9,374,426 B2* | 6/2016 | Pahlavan | G06F 9/4445 |
| 9,413,831 B2* | 8/2016 | Pahlavan | G06F 9/4445 |
| 9,444,894 B2* | 9/2016 | Pahlavan | G06F 9/4445 |
| 2003/0093491 A1 | 5/2003 | Valjakka et al. | |
| 2004/0107401 A1 | 6/2004 | Sung et al. | |
| 2005/0125716 A1 | 6/2005 | Cragun et al. | |
| 2006/0152487 A1 | 7/2006 | Grunnet-Jepsen et al. | |
| 2007/0061465 A1 | 3/2007 | Kim et al. | |
| 2007/0226606 A1 | 9/2007 | Noyes et al. | |
| 2007/0265091 A1 | 11/2007 | Aguilar, Jr. et al. | |
| 2008/0126939 A1 | 5/2008 | Chung et al. | |
| 2008/0136796 A1 | 6/2008 | Dowling | |
| 2008/0209021 A1 | 8/2008 | Shamma | |
| 2009/0297118 A1 | 12/2009 | Fink et al. | |
| 2009/0303018 A1* | 12/2009 | Catteau | G06K 17/0022 340/10.6 |
| 2010/0010961 A1 | 1/2010 | Golwalkar et al. | |
| 2010/0138746 A1 | 6/2010 | Zarom | |
| 2010/0150404 A1 | 6/2010 | Marks et al. | |
| 2010/0268828 A1* | 10/2010 | Pahlavan | G06F 9/4445 709/227 |
| 2010/0268939 A1* | 10/2010 | Pahlavan | G06F 9/4445 713/155 |
| 2010/0268940 A1* | 10/2010 | Pahlavan | G06F 9/4445 713/155 |
| 2010/0268941 A1* | 10/2010 | Pahlavan | G06F 9/4445 713/155 |
| 2010/0269047 A1* | 10/2010 | Pahlavan | G06F 9/4445 715/740 |
| 2010/0269048 A1* | 10/2010 | Pahlavan | G06F 9/4445 715/740 |
| 2010/0269057 A1* | 10/2010 | Pahlavan | G06F 9/4445 715/773 |
| 2010/0269152 A1* | 10/2010 | Pahlavan | G06F 9/4445 726/3 |
| 2010/0273450 A1* | 10/2010 | Papineau | G06F 8/60 455/411 |
| 2010/0306232 A1 | 12/2010 | Heminghous et al. | |
| 2011/0055035 A1* | 3/2011 | Koskay | G06Q 10/10 705/26.1 |
| 2011/0161856 A1 | 6/2011 | Nurmi et al. | |
| 2011/0219420 A1 | 9/2011 | Raveendran et al. | |
| 2011/0251992 A1 | 10/2011 | Bethlehem et al. | |
| 2012/0011550 A1 | 1/2012 | Holland | |
| 2012/0058743 A1* | 3/2012 | Chen | H04W 12/12 455/411 |
| 2012/0159329 A1 | 6/2012 | Chow et al. | |
| 2012/0216513 A1 | 8/2012 | Sip | |
| 2012/0272149 A1 | 10/2012 | Lee et al. | |
| 2012/0284374 A1* | 11/2012 | Deutsch | H04L 29/12367 709/220 |
| 2012/0324404 A1* | 12/2012 | Pahlavan | G06F 9/4445 715/866 |
| 2013/0007096 A1* | 1/2013 | Pahlavan | G06F 9/4445 709/202 |
| 2013/0007724 A1 | 1/2013 | Lai et al. | |
| 2013/0053190 A1 | 2/2013 | Mettler | |
| 2013/0067085 A1 | 3/2013 | Hershko et al. | |
| 2013/0169546 A1 | 7/2013 | Thomas et al. | |
| 2013/0222266 A1 | 8/2013 | Gärdenfors et al. | |
| 2015/0019638 A1* | 1/2015 | Pahlavan | G06F 9/4445 709/203 |

FOREIGN PATENT DOCUMENTS

| | | |
|---|---|---|
| CN | 101410878 A | 4/2009 |
| CN | 101579575 A | 11/2009 |
| CN | 101931479 A | 12/2010 |
| CN | 102428463 A | 4/2012 |
| WO | WO 2009/074762 A1 | 6/2009 |
| WO | WO 2010/130992 A1 | 11/2010 |
| WO | WO 2012/016497 A1 | 2/2012 |

* cited by examiner

MULTIMEDIA GENERATING METHOD AND RELATED COMPUTER PROGRAM PRODUCT

CROSS-REFERENCE TO RELATED APPLICATIONS

This application is a Divisional of co-pending U.S. patent application Ser. No. 13/627,676, filed on Sep. 26, 2012, which claims the benefit of priority under 35 U.S.C. § 119(e) to U.S. Provisional Application No. 61/605,771, filed on Mar. 2, 2012 and also claims the benefit of priority to Taiwanese Patent Application No. 101130868, filed on Aug. 24, 2012. The entire contents of which are hereby incorporated by reference for all purposes.

BACKGROUND

The present disclosure generally relates to a cross-platform multimedia interaction system and, more particularly, to a cross-platform multimedia interaction system with multiple displays and dynamically-configured hierarchical servers and related method, electronic device and computer program product.

As the technology progresses, more and more electronic devices are capable of connecting to the internet. For example, many desktop computers, desktop game machines, business machines, most mobile electronic devices (such as mobile phones, tablet computers, notebook computers, or hand-held game machines), and even some home appliances (such as televisions, refrigerators, and audio playback systems) are able to be connected to the internet. Above electronic devices may connect to the internet via wired or wireless communication mechanism. Different electronic devices may communicate data with each other by using additional communication circuits, such as Bluetooth devices, infrared devices, near field communication (NFC) devices, or the like. In addition, each of the above electronic devices is equipped with a display for allowing the user to input control commands or presenting multimedia contents to the user.

However, if different users of different electronic devices want to conduct interaction operations regarding multimedia contents, such as playing interaction games with multiple players or chatting online with multiple users, then those different electronic devices should be provided with extra communication circuits using the same communication protocol so that multimedia contents can be communicated between those electronic devices. Such solution is apparently not realistic because extra communication circuits, such as the above Bluetooth devices, infrared devices, or NFC devices, not only increase the hardware cost of the electronic device, but also increase the entire volume and size of each electronic device.

Nowadays, the design trend in many electronic devices (such as mobile phones and tablet computers) is toward reducing their weight and thickness. It is thus difficult to install various communication circuits of different communication protocols into the limited space inside a single electronic device. Due to the above hardware restriction, it is very difficult to achieve cross-platform interaction operations regarding multimedia contents among different electronic devices.

SUMMARY

An example embodiment of a multimedia generating method for use in a target electronic device is disclosed, comprising: communicating the target electronic device with a central relay server (CRS) via internet to conduct an identity authentication; receiving an activation command from the CRS via internet; after receiving the activation command, activating a websocket server module in the target electronic device to establish one or more network sockets between the target electronic device and other electronic devices, so that the target electronic device and other electronic devices communicate control parameters via the websocket server module; generating one or more corresponding images according to control parameters received from other electronic devices; and displaying the one or more images on a display of the target electronic device.

An example embodiment of a computer program product, stored in a non-transitory storage device of a target electronic device, when executed by a control circuit of the target electronic device, enabling the target electronic device to conduct a multimedia generating operation is disclosed. The multimedia generating operation comprises: communicating the target electronic device with a CRS via internet to conduct an identity authentication; receiving an activation command from the CRS via internet; after receiving the activation command, activating a websocket server module in the target electronic device to establish one or more network sockets between the target electronic device and other electronic devices, so that the target electronic device and other electronic devices communicate control parameters via the websocket server module; generating one or more corresponding images according to control parameters received from other electronic devices; and displaying the one or more images on a display of the target electronic device.

Both the foregoing general description and the following detailed description are examples and explanatory only, and are not restrictive of the invention as claimed.

DETAILED DESCRIPTION

Reference will now be made in detail to embodiments of the invention, which are illustrated in the accompanying drawings. The same reference numbers may be used throughout the drawings to refer to the same or like parts or operations.

Figure 1:
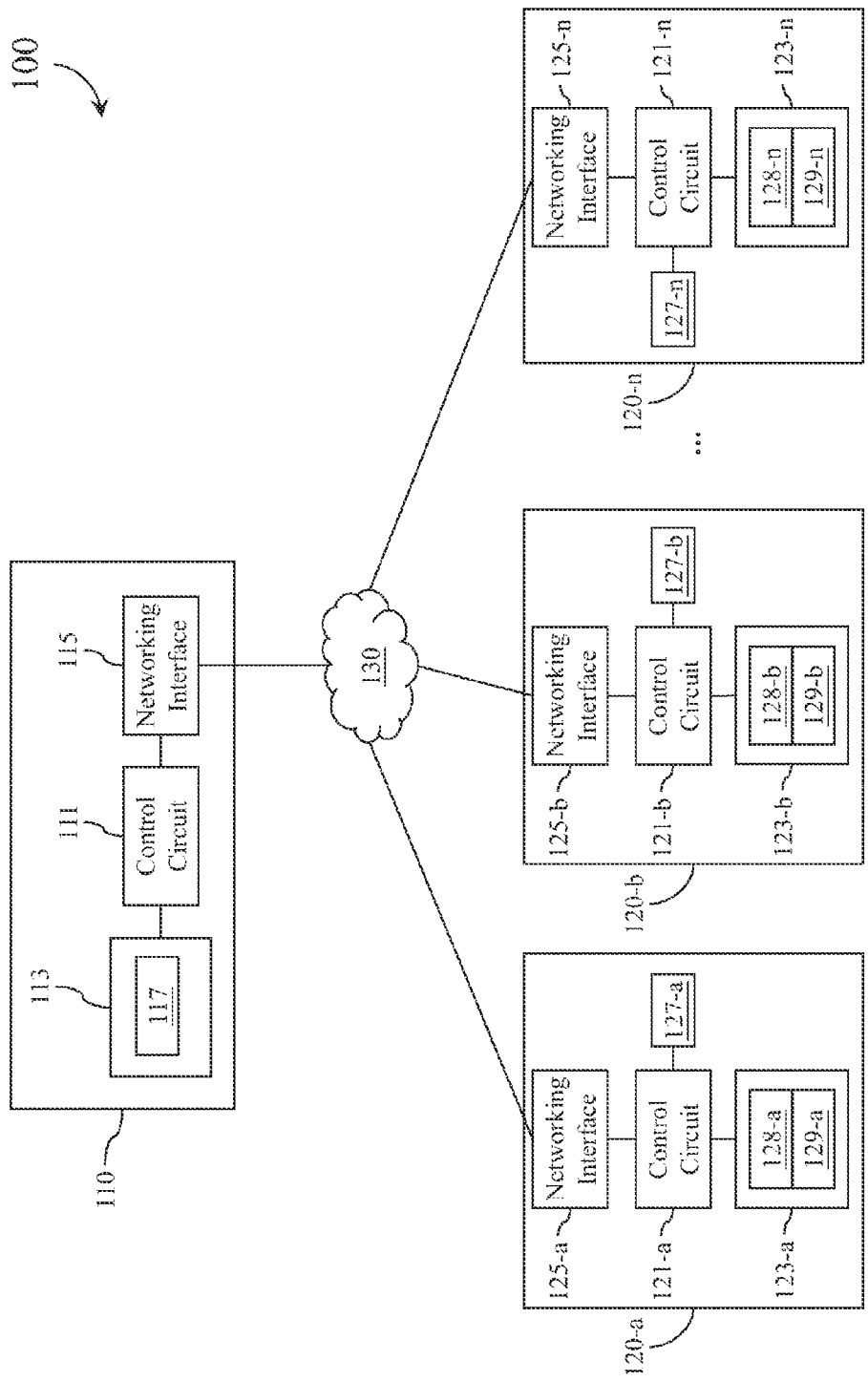
FIG. 1 is a simplified functional block diagram of a cross-platform multimedia interaction system according to an example embodiment.

Please refer to FIG. 1, which shows a simplified functional block diagram of a cross-platform multimedia interaction system 100 according to an example embodiment. The cross-platform multimedia interaction system 100 comprises a central relay server (CRS) 110, and a plurality of electronic devices (e.g., 120-a~120-n are shown as example). In the cross-platform multimedia interaction system 100, users may utilize the electronic devices 120-a~120-n to conduct interaction operations regarding multimedia contents, such as various online sport games, card games, role-playing games, action games, adventure game, strategy games, real-time strategy games, multimedia-related interaction, and multimedia-related collaborative editing.

In this embodiment, the electronic devices 120-a~120-n link to and communicate with the CRS 110 via the internet 130. In operations, the CRS 110 dynamically selects an appropriate electronic device from the electronic devices 120-a~120-n as a local relay server (LRS). The selected electronic device plays the role of a websocket server and acts as an intermediate for communicating control parameters among the electronic devices 120-a~120-n. The electronic devices 120-a~120-n generate corresponding multimedia contents, such as images, animations, or sounds, according to received control parameters. In other words, the cross-platform multimedia interaction system 100 is a system with dynamically-configured hierarchical servers.

As shown in FIG. 1, the CRS 110 comprises a control circuit 111, a storage device 113, and a networking interface 115, wherein the storage device 113 and the networking interface 115 are coupled with the control circuit 111. In addition, a server selection module 117 is stored in the storage device 113. In implementations, the server selection module 117 may be realized by one or more application programs. The storage device 113 may be realized by volatile memory or non-volatile memory. The control circuit 111 may be realized with one or more processor units. The networking interface 115 may be a wired networking interface, a wireless networking interface, or a hybrid circuit integrated with the above two functionalities. For the convenience of description, other components of the CRS 110 and related connections are not shown in FIG. 1. In implementations, the CRS 110 may be realized with multiple servers located in the same area, or may be realized with multiple servers located in different geographical areas.

Throughout the specification and drawings, indexes a~n may be used in the reference numbers of components and devices for ease of referring to respective components and devices. The use of indexes a~n does not intend to restrict the count of components and devices to any specific number. In the specification and drawings, if a reference number of a particular component or device is used without using the index, it means that the reference number is used to refer to any unspecific component or device of corresponding component group or device group. For example, the reference number 121-a is used to refer to the specific control circuit 121-a, and the reference number 121 is used to refer to any control circuit of the control circuits 121-a~121-n. In another example, the reference number 120-b is used to refer to the specific electronic device 120-b, and the reference number 120 is used to refer to any electronic device of electronic devices 120-a~120-n.

In the embodiment of FIG. 1, each of the electronic devices 120-a~120-n comprises a control circuit 121, a storage device 123, a networking interface 125, and a display 127, wherein the storage device 123, the networking interface 125, and the display 127 are coupled with the control circuit 121. The control circuit 121 may be realized with one or more processor units. The networking interface 125 may be a wired networking interface, a wireless networking interface, or a hybrid circuit integrated with the above two functionalities.

In addition, a web browser module 128 and a multimedia generating module 129 are stored in the storage device 123. The multimedia generating module 129 comprises a websocket server module and may be realized with one or more application programs. In implementations, the web browser module 128 and the multimedia generating module 129 may be integrated into a single functional module, or may be realized by different functional modules. For example, the web browser module 128 in the electronic device 120 may be integrated into the multimedia generating module 129.

In applications, the electronic devices 120-a~120-n may be a plurality of electronic devices having the same hardware specification and operating system, or may be a plurality of electronic devices having different hardware specifications and operating systems. In other words, the electronic devices 120-a~120-n may be various combination of desktop computers, desktop game machines, business machines, mobile electronic devices (such as mobile phones, tablet computers, notebook computers, netbook computers, e-books, or hand-held game machines), or various home appliances (such as televisions, refrigerators, and audio playback systems) that are capable of connecting to the internet.

For the convenience of description, other components of the electronic device 120 and related connections are not shown in FIG. 1.

The operations of the cross-platform multimedia interaction system 100 will be further described in the following with reference to FIG. 2.

Figure 2:
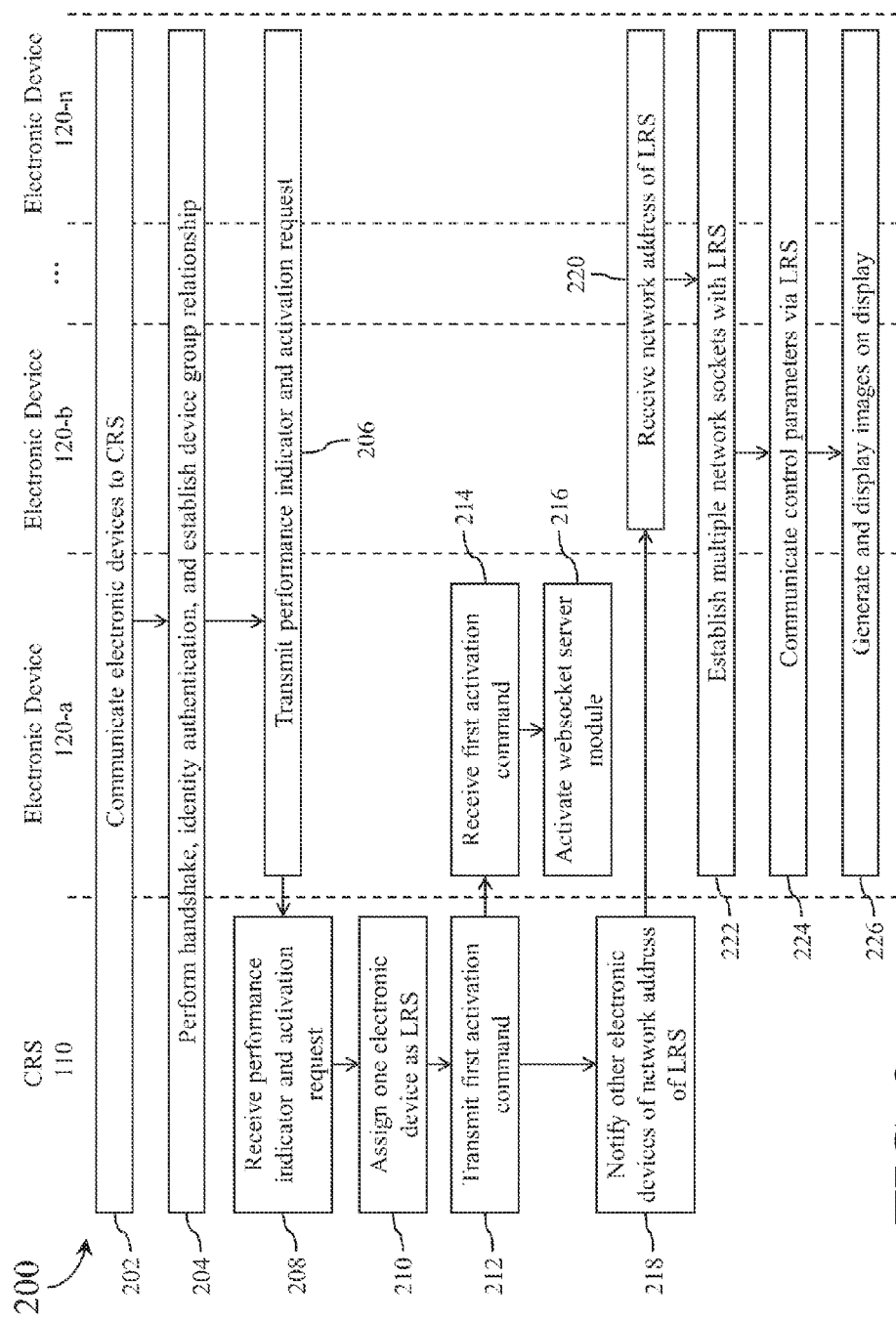
FIG. 2 is a simplified flowchart illustrating a multimedia generating method for use in the cross-platform multimedia interaction system of FIG. 1 in accordance with an example embodiment.

FIG. 2 is a simplified flowchart 200 illustrating a multimedia generating method for use in the cross-platform multimedia interaction system 100 in accordance with an example embodiment.

In the flowchart 200, operations within a column under the name of a specific device are operations to be performed by the specific device. For example, operations within a column under the label "CRS 110" are operations to be performed by the CRS 110, and operations within a column under the label "electronic device 120-a" are operations to be performed by the electronic device 120-a, and so forth. The same analogous arrangement is applicable to the subsequent flowcharts.

During performing the multimedia generating method illustrated in the flowchart 200, the control circuit 111 of the CRS 110 executes the server selection module 117 to enable the CRS 110 to perform partial or all operations within the corresponding column. The control circuit 121 of the electronic device 120 also executes the multimedia generating module 129 to enable the electronic device 120 to perform partial or all operations within the corresponding column.

In operation 202, the web browser modules 128-a~128-n communicate the electronic devices 120-a~120-n to the CRS 110 via the internet 130 and respective networking interfaces 125-a~125-n.

In operation 204, the CRS 110 and the electronic devices 120-a~120-n preform a handshake procedure, an identity authentication, and establish a device group relationship among the electronic devices 120-a~120-n. After the CRS 110 completed the handshake procedure with each of the electronic devices 120-a~120-n, the CRS 110 obtains the network address of the electronic devices 120-a~120-n.

During performing the identity authentication, the CRS 110 may generate related identity inquiry webpages and display the identity inquiry webpages on the display 127 through the web browser module 128 of the electronic device 120 to prompt the user of the electronic device 120 to input an identification code (such as the user's alias or ID number) and a password.

In one embodiment, when the CRS 110 establishes the device group relationship among the electronic devices 120-a~120-n, the CRS 110 may ask a user of the electronic device 120 that is first electronic device entering into the operation 204 to select or to input a specific group ID. Afterward, when other electronic devices 120 enter the operation 204, the CRS 110 may demand the users of these electronic devices 120 to select or to input a group ID, and then the CRS 110 groups the electronic devices 120 using the same group ID into a same device group. In applications, the user of the electronic device 120 first entering into the operation 204 may notify the users of the other electronic devices 120 of the selected or inputted group ID by using the telephone, email, instant communication software, oral notice, or other appropriate manners, so that the electronic devices 120 operated by these users can be grouped as the same device group by the CRS 110.

In addition, the CRS 110 in the operation 204 may also request the user of the electronic device 120 to input a device ID of the electronic device 120 via the web browser module 128, such as a unique device code or the MAC address of the electronic device 120, to increase the security level of the identity authentication. Alternatively, the CRS 110 may request the user of the electronic device 120 to input the device ID of the electronic device 120 only at the first time the electronic device 120 enters into the operation 204, and record the pairing relationship of the device ID and the user's identification code in the storage device 113.

In one embodiment, after the electronic device 120 completed the handshake procedure with the CRS 110, the electronic device 120 and the CRS 110 terminate a network session between them so as to reduce the bandwidth loading of the CRS 110. For example, when the electronic device 120 completed the handshake procedure with the CRS 110, the web browser module 128 may perform other procedures in the operation 204 and subsequent operations by transmitting AJAX (Asynchronous JavaScript and XML) commands to the CRS 110. Since after the web browser module 128 transmitted the AJAX commands to the CRS 110, the network session between the electronic device 120 and the CRS 110 would be terminated, and thus the loading of the CRS 110 can be effectively reduced. In implementations, instead of using the AJAX commands, other approaches may be employed to terminate the network session between the electronic device 120 and the CRS 110 after the handshake procedure to reduce required networking bandwidth of the CRS 110.

In operation 206, the electronic devices 120-a~120-n respectively utilize the web browser modules 128-a~128-n to transmit their respective performance indicators to the CRS 110 via the internet 130. The performance indicators of each electronic device 120 comprise one or more of the following messages: a processor computing power of the electronic device 120, a total memory capacity of the electronic device 120, a remaining memory capacity of the electronic device 120, a remaining battery level of the electronic device 120, and a next hop count of the electronic device 120. Alternatively, the performance indicators may be a comprehensive parameter calculated based on the above messages. The afore-mentioned next hop count may refer to a next hop count between the electronic device 120 and the CRS 110, a next hop count between the electronic device 120 and the LRS, or a total next hop count between the electronic device 120 and each of other electronic devices in the cross-platform multimedia interaction system 100.

In addition to the performance indicator, the electronic device 120 in the operation 206 may utilize the web browser module 128 to transmit an activation request to the CRS 110 via the internet 130 to request the CRS 110 to choose the electronic device 120 as a local relay server.

In operation 208, the CRS 110 receives the performance indicators and activation request from each of the electronic devices 120-a~120-n.

In operation 210, the CRS 110 dynamically assigns one of the electronic devices 120-a~120-n as a local relay server (LRS). In one embodiment, the CRS 110 may simply select the electronic device corresponding to the first received activation request as the LRS. For the purpose of explanatory convenience in the following description, it is assumed herein that the CRS 110 selects the electronic device 120-a as the LRS in the operation 210.

In operation 212, the CRS 110 transmits a first activation command to the selected electronic device 120-a via the internet 130 to make it become the LRS and instruct the electronic device 120-a to activate the websocket server module of the electronic device 120-a.

In operation 214, the electronic device 120-a receives the first activation command through the web browser module 128-a.

Then, the electronic device 120-a performs operation 216 to utilize the control circuit 121-a to execute the websocket server module of the multimedia generating module 129-a to activate the websocket server module of the electronic device 120-a, so that the electronic device 120-a begins to provide websocket server functionalities.

In operation 218, the CRS 110 notifies other electronic devices 120-b~120-n of a network address of the LRS, e.g., an IP address of the electronic device 120-a in this case, via the internet 130.

In operation 220, the electronic devices 120-b~120-n receive the network address transmitted from the CRS 110 through the web browser modules 128-b~128-n.

After the electronic device 120-a activated its websocket server module to act as the LRS, the electronic devices 120-b~120-n proceed to operation 222 to utilize the web browser modules 128-b~128-n to establish multiple network sockets with the LRS.

In operation 224, the electronic devices 120-a~120-n utilize the web browser modules 128-a~128-n to communicate control parameters among the electronic devices 120-a~120-n via the websocket server module in the LRS (e.g., the electronic device 120-a in this case). The afore-mentioned control parameters are parameters employed by one electronic device to configure, control, change, or adjust the multimedia contents presented by another electronic device. For example, the control parameters may be related to the image attributes, such as the shape, size, color, position, lasting time, moving direction, or moving speed of one or more image objects.

When the electronic device 120-b want to transmit a first control parameter to the electronic device 120-c, the electronic device 120-b may utilize the web browser module 128-b to transmit the first control parameter to the websocket server module in the LRS via a first network socket between the electronic device 120-b and the LRS. The websocket server module in the LRS receives the first control parameter through the first network socket and stores the first control parameter.

Then, the electronic device 120-*c* may utilize the web browser module 128-*c* to inquiry the LRS about whether there is any control parameter generated by other electronic device to be transmitted to the electronic device 120-*c* using a polling method via a second network socket between the electronic device 120-*c* and the LRS. When the web browser module 128-*c* of the electronic device 120-*c* detected that the first control parameter stored in the LRS is to be transmitted to the electronic device 120-*c*, the web browser module 128-*c* retrieves the first control parameter from the websocket server module in the LRS via the second network socket.

Alternatively, the websocket server module of the LRS may actively transmit the first control parameter to the web browser module 128-*c* of the electronic device 120-*c* via the second network socket by using an appropriate web communication protocol, such as the HTML5 protocol.

Similarly, the electronic device 120-*c* want to transmit a second control parameter to the electronic device 120-*b*, the electronic device 120-*c* may utilize the web browser module 128-*c* to transmit the second control parameter to the websocket server module in the LRS via the second network socket. The websocket server module in the LRS receives the second control parameter through the second network socket and stores the second control parameter.

Then, the electronic device 120-*b* may utilize the web browser module 128-*b* to inquiry the LRS about whether there is any control parameter generated by other electronic device to be transmitted to the electronic device 120-*b* using a polling method via a first network socket. When the web browser module 128-*b* of the electronic device 120-*b* detected that the second control parameter stored in the LRS is to be transmitted to the electronic device 120-*b*, the web browser module 128-*b* retrieves the second control parameter from the websocket server module in the LRS via the first network socket.

Alternatively, the websocket server module of the LRS may actively transmit the second control parameter to the web browser module 128-*b* of the electronic device 120-*b* via the first network socket.

As can be appreciated from the foregoing descriptions, when any of the electronic devices 120-*a*~120-*n* want to transmit control parameters to other electronic devices, the electronic device utilizes the web browser module 128 to transmit the control parameters to the websocket server module in the LRS. Other electronic devices then utilize respective web browser modules 128 to receive the control parameters from the websocket server module of the LRS. In this way, the electronic devices 120-*a*~120-*n* may utilize the websocket server module in the LRS as an intermediate for control parameter communication, so that the CRS 110 needs not to act as an intermediate for communicating control parameters among the electronic devices 120-*a*~120-*n*. As a result, the communication bandwidth requirement of the CRS 110 can be significantly reduced.

In some embodiments, when the foregoing multimedia generating method is applied in a multi-user interaction operation regarding image contents, the electronic device 120 further performs operation 226 to generate one or more corresponding images according to the control parameters retrieved from the websocket server module of the LRS, and utilizes the web browser module 128 to display the one or more images on the display 127. In the operation 226, the control circuit 121 of the electronic device 120 may configure or adjust the images attributes, such as shape, size, color, position, lasting time, moving direction, or moving speed, of one or more image objects according to the retrieved control parameters to generate one or more corresponding images, and then utilizes the web browser module 128 to display the one or more images on the display 127.

Taking the afore-mentioned electronic device 120-*b* as an example. The control circuit 121-*b* of the electronic device 120-*b* in the operation 226 may generate one or more corresponding images according to the second control parameter retrieved from the LRS, and then utilizes the web browser module 128-*b* to display the one or more images no the display 127-*b* to present updated images to the user of the electronic device 120-*b*. Similarly, the control circuit 121-*c* of the electronic device 120-*c* in the operation 226 may generate one or more corresponding images according to the first control parameter retrieved from the LRS, and then utilizes the web browser module 128-*c* to display the one or more images on the display 127-*c* to present updated images to the user of the electronic device 120-*c*.

In other words, the electronic device 120-*b* is capable of changing the images displayed on the display 127-*c* of the electronic device 120-*c* by transmitting the first control parameter to the electronic device 120-*c* via the websocket server module of the LRS, and the electronic device 120-*c* is capable of changing images displayed on the display 127-*b* of the electronic device 120-*b* by transmitting the second control parameter to the electronic device 120-*b* via the websocket server module. In this way, the user of the electronic device 120-*b* and the electronic device 120-*c* are allowed to use the electronic device 120-*b* and the electronic device 120-*c* to conduct interaction operations regarding image contents.

Similarly, other electronic devices of the cross-platform multimedia interaction system 100 can also conduct interaction operations regarding multimedia contents with each other by using the afore-mentioned method.

In implementations, some multimedia data, such as background images, initial image objects, or animations, or parameters for generating above multimedia data required by the electronic devices 120-*a*~120-*n* during conducting the interaction operations regarding multimedia contents, may be provided by the CRS 110 or other multimedia server. For example, in one embodiment, the control circuit 111 of the CRS 110 provides same multimedia data for the electronic devices 120-*a*~120-*n*, and links the multimedia data to a single URL (uniform resource locator). In this embodiment, the web browser modules 128-*a*~128-*n* of the electronic devices 120-*a*~120-*n* may link to the single URL to retrieve the same multimedia data.

In another embodiment, the control circuit 111 of the CRS 110 may provide different multimedia data for different electronic devices according to their respective roles in the multimedia interaction operations, and links different multimedia data to different web addresses. In this embodiment, different electronic devices of the electronic devices 120-*a*~120-*n* may link to the CRS 110 via different web addresses according to a predetermined rule or based on the user configuration to retrieve the multimedia data as needed.

For example, the control circuit 111 of the CRS 110 may provide a first type data for the electronic device playing a master role in the multimedia interaction operations and link the first type data to a first web address. Additionally, the CRS 110 may provide a second type data for the electronic device playing a slave role in the multimedia interaction operations and link the second type data to a second web address. Under such arrangements, one or more electronic devices of the electronic devices 120-*a*~120-*n*, such as the electronic devices 120-*a* and 120-*b*, may link to the CRS 110 via the first web address to retrieve the first type data, and another one or more electronic devices of the electronic devices 120-*a*~120-*n*, such as the electronic devices 120-*c* and 120-*n*, may link to the CRS 110 via the second web address to retrieve the second type data.

In implementations, the electronic device 120 may generate corresponding images according to the multimedia data provided by the CRS 110, and display on the display 127 together with the images generated in the operation 226. For example, in the previous embodiment where the electronic device 120-*b* and the electronic device 120-*c* conduct multimedia interaction operations, the web browser module 128-*b* of the electronic device 120-*b* may generate a first image according to the first type data and display on the display 127-*b*, and the web browser module 128-*c* of the electronic device 120-*c* may generate a second image according to the second type data and display on the display 127-*c*.

Similarly, other electronic device (such as the electronic device 120-*n*) may generate the first image according to the first type data and display on its own display (e.g., the display 127-*n* in this case), or may generate the second image according to the second type data and display on its own display.

In operation, according to the user's configuration, the same electronic device 120 may link to the CRS 110 via different web addresses in the same or different time periods to retrieve different multimedia data for use in different type of electronic devices. As a result, the same electronic device 120 is allowed to switch between different roles in the multimedia interaction operations.

In addition, some or all communication data (such as game parameters, game scores, and chatting records) stored in the LRS may be duplicated to other one or more electronic devices during the operations of the LRS. For example, the websocket server module of the LRS (e.g., the electronic device 120-*a* in this case) may actively transmit some or all control parameters stored in the LRS to other one or more electronic devices for backup purpose. Alternatively, when a particular electronic device inquires the LRS about whether there is any control parameters to be retrieved by using a polling method, the websocket server module of the LRS may provide control parameters to be transmitted to the particular electronic device and other control parameters to the particular electronic device for backup purpose.

In another embodiment, the CRS 110 in the operation 210 may select one of the electronic devices 120-*a*~120-*n* as the LRS according to respective performance indicators of the electronic devices 120-*a*~120-*n*. For example, the CRS 110 may compare only a single performance indicator of the electronic devices 120-*a*~120-*n*, and select an electronic device having the best performance in the single performance indicator as the LRS. Alternatively, the CRS 110 may take multiple performance indicators of the electronic devices 120-*a*~120-*n* into consideration, such as performing a weight blending on the multiple performance indicators of each electronic device 120, and select an electronic device having the best performance under the comprehensive evaluation as the LRS.

As described previously, the CRS 110 obtains the respective network addresses of the electronic devices 120-*a*~120-*n* in the operation 204. Accordingly, when the CRS 110 in the operation 210 performs the single performance indicator comparison or the comprehensive evaluation of multiple performance indicators, the CRS 110 may take a count of neighboring electronic devices located within the same predetermined network section as a particular electronic device 120 as another performance indicator of the particular electronic device 120, and take it into consideration in the operation 210.

Figure 3:
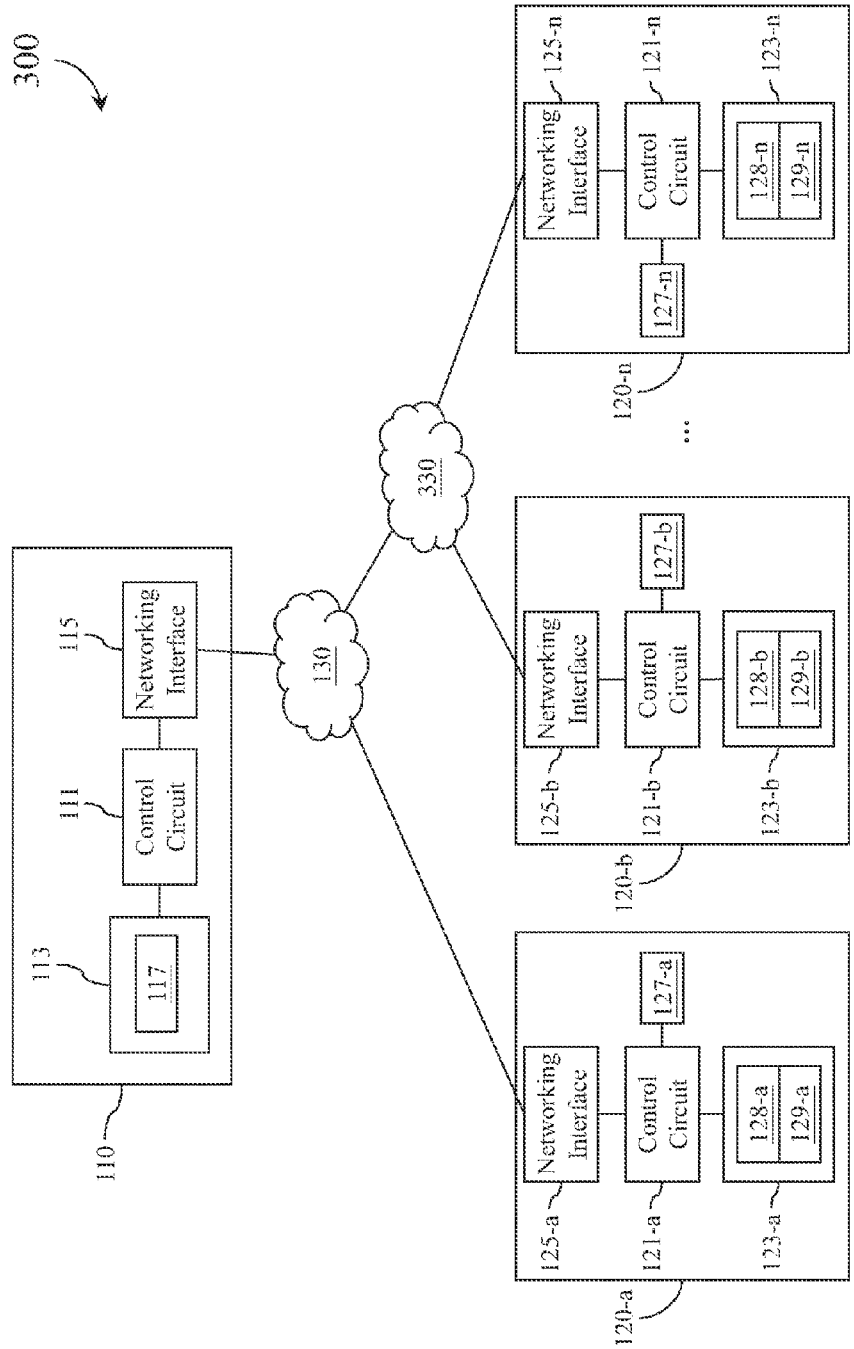
FIG. 3 is a simplified functional block diagram of a cross-platform multimedia interaction system according to another example embodiment.

For example, FIG. 3 shows a simplified functional block diagram of a cross-platform multimedia interaction system 300 according to another example embodiment. In the embodiment of FIG. 3, the electronic device 120-*a* is directly connected to the CRS 110 via the internet 130, and the electronic devices 120-*b*~120-*n* are connected to the internet 130 via an intranet 330 and then indirectly connected to the CRS 110. Accordingly, the electronic devices 120-*b*~120-*n* are located in the same or neighboring network sections. In the cross-platform multimedia interaction system 300, the CRS 110 in the operation 210 may select an electronic device having the greatest amount of neighboring electronic devices or having a greatest next hop count, such as one of the electronic devices 120-*b*~120-*n*, to be the LRS. Such method of selecting the LRS improves the speed of generating and interacting multimedia contents in the cross-platform multimedia interaction system 300.

Figure 4:
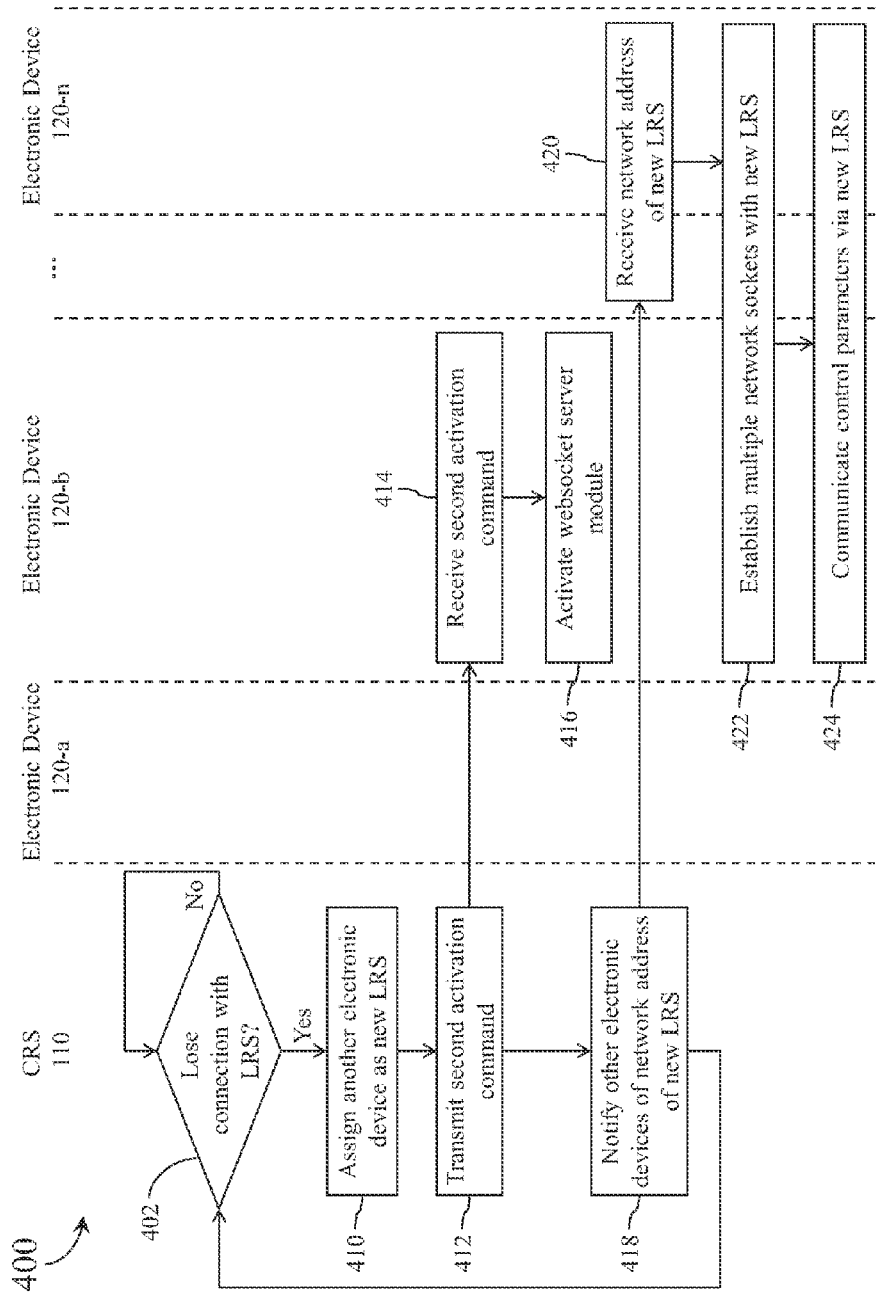
FIG. 4 is a simplified flowchart illustrating a method for dynamically changing a local relay server of the cross-platform multimedia interaction system of FIG. 1 in accordance with an example embodiment.

FIG. 4 is a simplified flowchart 400 illustrating a method for dynamically changing a local relay server of the cross-platform multimedia interaction system 100 in accordance with an example embodiment. In this embodiment, the control circuit 111 of the CRS 110 executes the server selection module 117 to enable the CRS 110 to perform some or all operations within the corresponding column. The control circuit 121 of the electronic device 120 executes the multimedia generating module 129 to enable the electronic device 120 to perform some or all operations within the corresponding column. While performing the multimedia generating method of the flowchart 200, the cross-platform multimedia interaction system 100 may simultaneously perform the method of the flowchart 400 to dynamically change the LRS.

For example, the CRS 110 may begin to perform operation 402 of the flowchart 400 after a certain period since completing the operation 218 of the flowchart 200 to intermittently detect the situation of network connection with the LRS (e.g., the electronic device 120-*a* in this case). If the CRS 110 loses the connection with the LRS, e.g., when the LRS is powered off or the networking interface of the LRS malfunctions, the CRS 110 performs operation 410 to assign other electronic device as a new LRS to replace the current LRS.

In the operation 410, the CRS 110 may assign another electronic device of the electronic devices 120-*a*~120-*n* as the new LRS according to respective performance indicators of the electronic devices 120-*a*~120-*n*. Similar with the previous embodiment, the performance indicators of each electronic device comprise at least one of the following messages: a processor computing power of the electronic device 120, a total memory capacity of the electronic device 120, a remaining memory capacity of the electronic device 120, a remaining battery level of the electronic device 120, a count of neighboring electronic devices located within a same predetermined network section as the electronic device 120, and a next hop count of the electronic device 120.

The description regarding the implementations for the operation 210 in the previous embodiment is also applicable to the operation 410.

In this embodiment, the CRS 110 selects the electronic device 120-*b* as the new LRS in the operation 410.

In operation 412, the CRS 110 transmits a second activation command to the electronic device 120-*b* via the internet 130 to instruct the electronic device 120-*b* to activate the websocket server module of the electronic device 120-*b*.

In operation 414, the electronic device 120-*b* receives the second activation command via the web browser module 128-*b*.

Then, the electronic device 120-*b* proceeds to operation 416 to utilize the control circuit 121-*b* to execute the websocket server module in the multimedia generating module 129-*b* to activate the websocket server module in the electronic device 120-*b*, so that the electronic device 120-*b* begins to provide websocket server functionalities.

In operation 418, the CRS 110 notify the other electronic devices 120-*c*~120-*n* of a network address of the new LRS, e.g., an IP address of the electronic device 120-*b* in this case, via the internet 130.

In operation 420, the electronic devices 120-*c*~120-*n* utilize the web browser modules 128-*c*~128-*n* to receive the network address transmitted from the CRS 110.

After the electronic device 120-*b* activated its websocket server module, the electronic devices 120-*c*~120-*n* proceed to operation 422 to utilize the web browser modules 128-*c*~128-*n* to establish multiple network sockets between the new LRS and the electronic devices 120-*c*~120-*n*.

In operation 424, the electronic devices 120-*b*~120-*n* utilize the web browser modules 128-*b*~128-*n* to communicate subsequent control parameters with each other via the websocket server module of the electronic device 120-*b*. The description regarding the implementations for the operation 224 in the previous embodiment is also applicable to the operation 424.

Figure 5:
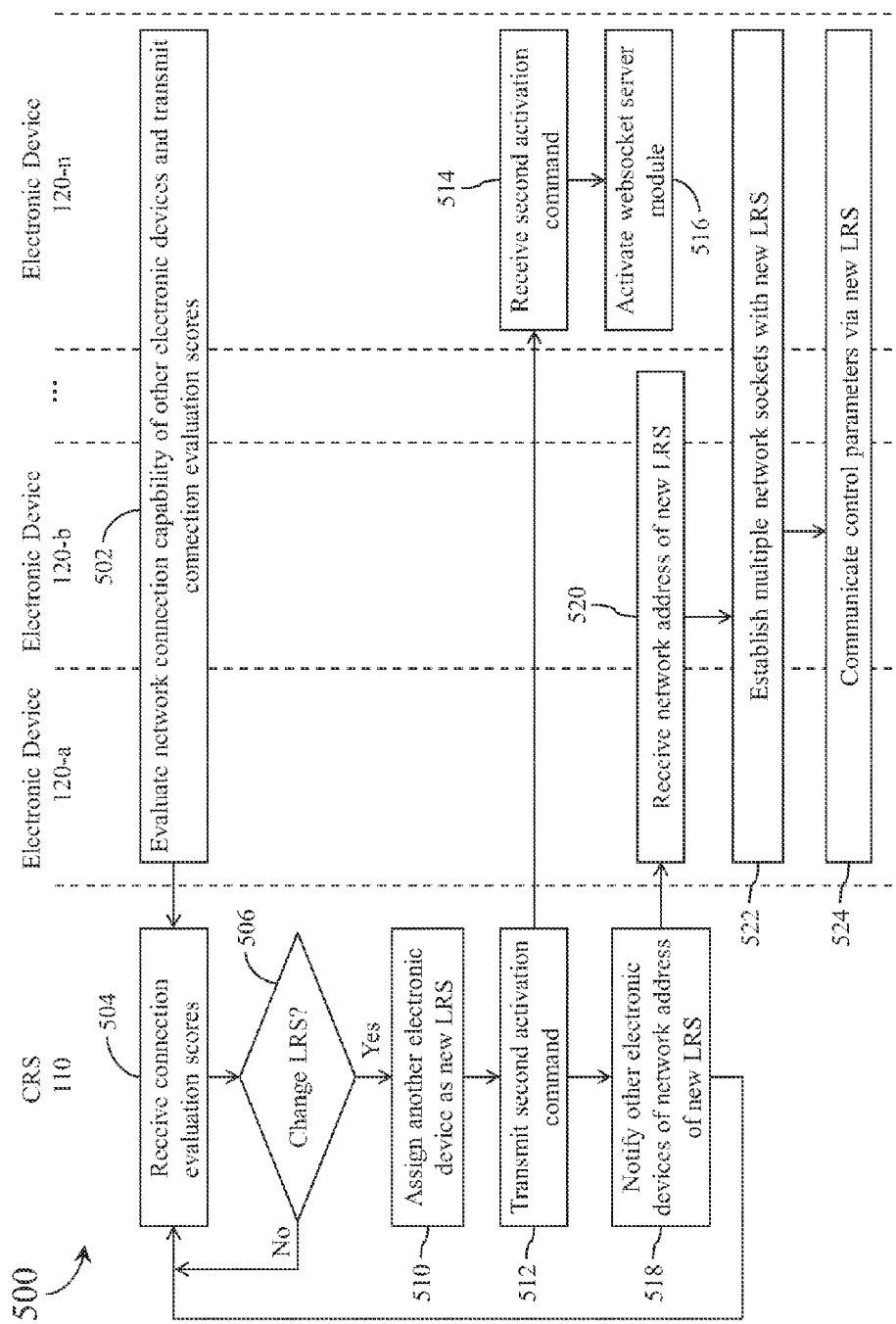
FIG. 5 is a simplified flowchart illustrating a method for dynamically changing a local relay server of the cross-platform multimedia interaction system of FIG. 1 in accordance with another example embodiment.

FIG. 5 is a simplified flowchart 500 illustrating a method for dynamically changing a local relay server of the cross-platform multimedia interaction system 100 in accordance with another example embodiment. When performing the method of the flowchart 500, the control circuit 111 of the CRS 110 executes the server selection module 117 to enable the CRS 110 to perform some or all operations within the corresponding column. The control circuit 121 of the electronic device 120 executes the multimedia generating module 129 to enable the electronic device 120 to perform some or all operations within the corresponding column. While performing the multimedia generating method of the flowchart 200, the cross-platform multimedia interaction system 100 may simultaneously perform the method of the flowchart 500 to dynamically change the LRS.

In one embodiment, the electronic device 120 may begin to perform operation 502 of the flowchart 500 after a certain period since completing the operation 222 of the flowchart 200 to intermittently evaluate the network connection capability of other electronic devices, and periodically utilize the web browser module 128 to transmit connection evaluation scores regarding other electronic devices to the CRS 110 via the internet 130. For example, the electronic device 120 may periodically try to establish connections with other electronic devices of the cross-platform multimedia interaction system 100. Each time the electronic device 120 successfully established a connection with a particular electronic device, the electronic device 120 may increase the connection evaluation score of the particular electronic device.

In addition, the electronic device 120 may adjust the increment when increasing the connection evaluation score of the particular electronic device according to the network connection type of the particular electronic device. For example, each time the electronic device 120-*b* successfully established a connection with the electronic device 120-*c*, the electronic device 120-*b* may increase the connection evaluation score of the electronic device 120-*c* by 3 points if the electronic device 120-*c* is connected to the internet via a connection cable; and the electronic device 120-*b* may increase the connection evaluation score of the electronic device 120-*c* by 1 point if the electronic device 120-*c* is connected to the internet using a wireless approach.

In operation 504, the CRS 110 may utilize the server selection module 117 to receive a plurality of connection evaluation scores regarding respective electronic devices transmitted from the electronic devices 120-*a*~120-*n* via the internet 130.

The CRS 110 may periodically perform operation 506 to determine whether to change the LRS.

In one embodiment of the operation 506, the CRS 110 may compare the connection evaluation scores of the electronic devices 120-*a*~120-*n*, and decide whether to replace the LRS according to the comparison result. For example, the CRS 110 may decide to replace the current LRS when detected that there is another electronic device having a connection evaluation score superior to the connection evaluation score of the current LRS. Alternatively, the CRS 110 may decide to replace the current LRS when detected that there is another electronic device having a connection evaluation score superior to the connection evaluation score of the current LRS over a predetermined degree, such as 20% or 30%.

In another embodiment, any one of the electronic devices 120-*a*~120-*n* may intermittently detect the situation of network connection with the LRS. If the electronic device 120 loses the connection with the LRS or the connection speed is lower than a threshold, then the electronic device 120 may utilize its web browser module to transmit a change request to the CRS 110 to request the CRS 110 to replace the current LRS. Therefore, in addition to compare the connection evaluation scores of the electronic devices 120-*a*~120-*n*, the CRS 110 in the operation 506 may also detect whether other electronic device of the electronic devices 120-*a*~120-*n* transmits a change request. The CRS 110 may decide to replace the current LRS only if the CRS 110 receives a change request. That is, when another electronic device's connection evaluation score is superior to the current LRS's connection evaluation score, the CRS 110 of this embodiment may replace the current LRS only if the CRS 110 received a change request from other electronic device.

In operation 510, the CRS 110 may select another electronic device in the electronic devices 120-*a*~120-*n* as a new LRS according to respective connection evaluation scores of the electronic devices 120-*a*~120-*n*. For example, the CRS 110 may select another electronic device whose connection evaluation score is superior to the current LRS's connection evaluation score as a new LRS.

In this embodiment, the CRS 110 selects the electronic device 120-*n* as the new LRS in the operation 510.

In operation 512, the CRS 110 transmits an activation command to the electronic device 120-*n* via the internet 130 to instruct the electronic device 120-*n* to activate the websocket server module of the electronic device 120-*n*.

In operation 514, the electronic device 120-*n* utilizes the web browser module 128-*n* to receive the activation command.

Then, the electronic device 120-*n* performs operation 516 to utilize the control circuit 121-*b* to execute the websocket server module of the multimedia generating module 129-*n*, so that the electronic device 120-*n* begins to provide websocket server functionalities.

In operation 518, the CRS 110 notifies the other electronic devices 120-*a*~120-*m* of the new LRS's network address, e.g., an IP address of the electronic device 120-*n*, via the internet 130.

In operation 520, the electronic devices 120-*a*~120-*m* utilize the web browser modules 128-*a*~128-*m* to receive the network address transmitted from the CRS 110.

After the electronic device 120-*n* activated its own web-socket server module, the electronic devices 120-*a*~120-*m* perform operation 522 to utilize the web browser modules 128-*a*~128-*m* to establish multiple network sockets between the new LRS and the electronic devices 120-*a*~120-*m*.

In operation 524, the electronic devices 120-*a*~120-*n* utilize the web browser modules 128-*a*~128-*n* to communicate subsequent control parameters with each other via the websocket server module of the electronic device 120-*n*. The description regarding the implementations for the operation 224 in the previous embodiment is also applicable to the operation 524.

Figure 6:
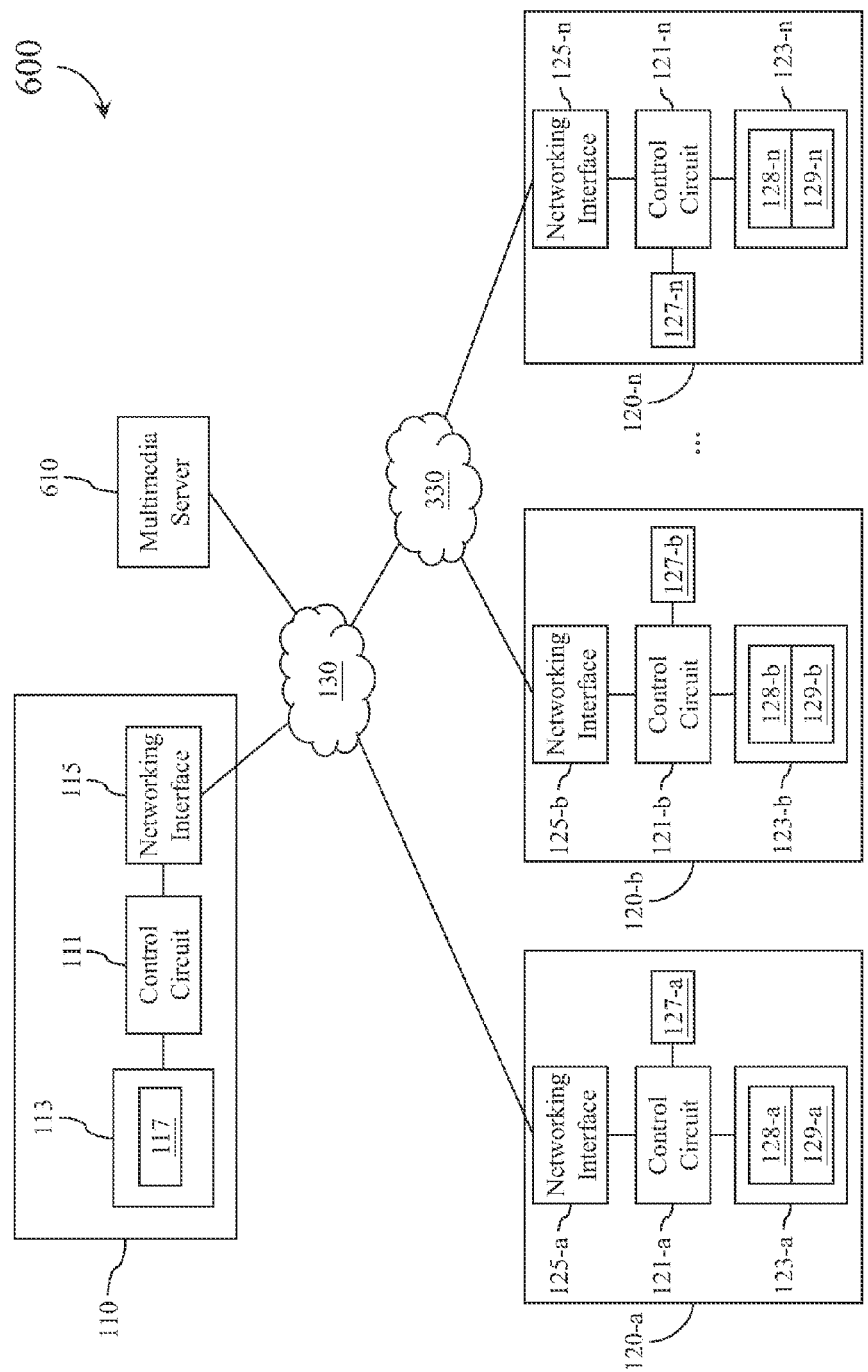
FIG. 6 is a simplified functional block diagram of a cross-platform multimedia interaction system according to yet another example embodiment.

As described previously, some multimedia data, such as background images, initial image objects, or animations, or parameters for generating above multimedia data required for the electronic devices 120-*a*~120-*n* during conducting the interaction operations regarding multimedia contents, may be provided by other multimedia server than the CRS 110. For example, FIG. 6 is a simplified functional block diagram of a cross-platform multimedia interaction system 600 according to yet another example embodiment. In the cross-platform multimedia interaction system 600, the CRS 110 acts similar as in the previous embodiments, but multimedia data required by the electronic devices 120-*a*~120-*n* during conducting the interaction operations regarding multimedia contents is provided by a multimedia server 610. In implementations, the multimedia server 610 may be realized with multiple servers located in the same area, or may be realized with multiple servers located in different geographical areas.

In one embodiment, the multimedia server 610 provides same multimedia data for the electronic devices 120-*a*~120-*n*, and links the multimedia data to a single URL. In this embodiment, the web browser modules 128-*a*~128-*n* of the electronic devices 120-*a*~120-*n* may link to the single URL to retrieve the same multimedia data generated by the multimedia server 610.

In another embodiment, the multimedia server 610 may provide different multimedia data for different electronic devices according to their respective roles in the multimedia interaction operations, and links different multimedia data to different web addresses. In this embodiment, different electronic devices of the electronic devices 120-*a*~120-*n* may link to the multimedia server 610 via different web addresses according to a predetermined rule or based on the user configuration to retrieve the multimedia data as needed.

For example, the multimedia server 610 may provide a first type data for the electronic device playing a master role in the multimedia interaction operations and link the first type data to a first web address. Additionally, the multimedia server 610 may provide a second type data for the electronic device playing a slave role in the multimedia interaction operations and link the second type data to a second web address. Under such arrangements, one or more electronic devices of the electronic devices 120-*a*~120-*n*, such as the electronic devices 120-*a* and 120-*b*, may link to the multimedia server 610 via the first web address to retrieve the first type data, and other one or more electronic devices of the electronic devices 120-*a*~120-*n*, such as the electronic devices 120-*c* and 120-*n*, may link to the multimedia server 610 via the second web address to retrieve the second type data.

In implementations, the electronic device 120 may generate corresponding images according to the multimedia data provided by the multimedia server 610, and display on the display 127 together with the images generated in the operation 226. For example, in the previous embodiment where the electronic device 120-*b* and the electronic device 120-*c* conduct multimedia interaction operations, the web browser module 128-*b* of the electronic device 120-*b* may generate a first image according to the first type data and display on the display 127-*b*, and the web browser module 128-*c* of the electronic device 120-*c* may generate a second image according to the second type data and display on the display 127-*c*.

Similarly, other electronic device (such as the electronic device 120-*n*) may generate the first image according to the first type data and display on its own display (e.g., the display 127-*n* in this case), or may generate the second image according to the second type data and display on its own display.

In operation, according to the user's configuration, the same electronic device 120 may link to the multimedia server 610 via different web addresses in the same or different time periods to retrieve different multimedia data for use in different type of electronic devices. As a result, the same electronic device 120 is allowed to switch between different roles in the multimedia interaction operations.

The structure of FIG. 6 further reduces the work loading of the CRS 110. In addition, multiple multimedia servers of different purpose may be employed in the cross-platform multimedia interaction system 600 to provide more multimedia-related interaction options to the users of the electronic devices 120-*a*~120-*n*.

The execution order of the operations in the previous flowcharts 200, 400, or 500 is merely an example, rather than a restriction to practical implementations. For example, in the flowchart 200, the operations 206 and 208 may be performed simultaneously and the operations 212 and 218 may be performed simultaneously or swapped. In addition, the electronic devices 120-*a*~120-*n* may intermittently perform the operation 206 after the operation 224 or 226. In the flowchart 400, the operations 412 and 418 may be performed simultaneously or swapped. Additionally, the CRS 110 may intermittently perform the operation 402 after the operation 418. In the flowchart 500, the operations 502 and 504 may be performed simultaneously and the operations 512 and 518 may be performed simultaneously or swapped. In addition, the CRS 110 may intermittently perform the operation 504 after the operation 518.

In the afore-mentioned embodiments, each of the multimedia generating modules 129-*a*~129-*n* of the electronic devices 120-*a*~120-*n* comprises a websocket server module, but this is merely an example, rather than a restriction of the practical implementations. For example, in another embodiment, only some electronic devices are provided with a multimedia generating module having a websocket server module therein, while the other electronic devices are provided with a multimedia generating module without the websocket server module therein.

As can be seen from the foregoing descriptions, the cross-platform multimedia interaction systems 100, 300, and 600 are systems with dynamically-configured hierarchical servers. The CRS 110 dynamically assigns a LRS so that the electronic devices 120-*a*~120-*n* utilize the web browser modules 128-*a*~128-*n* to communicate control parameters with each other via the websocket server module in the LRS. In this way, the CRS 110 needs not to act as a transmission intermediate of control parameters among the electronic devices 120-*a*~120-*n*. Accordingly, no extra communication circuit is required to be installed in each of the electronic devices 120-*a*~120-*n*. Above structure is also applicable to the application where the electronic devices 120-*a*~120-*n* have different operating systems. In addition, communicating control parameters among the electronic devices 120-*a*~120-*n* via the LRS not only reduces the work loading of the CRS 110, but also increases the response speed of multimedia-related interaction operations conducted by the electronic devices 120-*a*~120-*n*.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multimedia generating method for use in a target electronic device, comprising:
    utilizing a web browser module of the target electronic device to communicate the target electronic device with a central relay server (CRS) via internet to conduct an identity authentication;
    utilizing the web browser module to transmit performance indicators of the target electronic device and an activation request to the CRS via internet, so that the CRS compares the performance indicators of the target electronic device with performance indicators of other electronic devices;
    utilizing the web browser module to receive an activation command from the CRS via internet if the target electronic device is assigned to be a local relay server (LRS) by the CRS;
    after receiving the activation command, utilizing a control circuit of the target electronic device to activate a websocket server module in the target electronic device to establish one or more network sockets between the target electronic device and other electronic devices, so that the target electronic device and other electronic devices communicate control parameters via the websocket server module;
    utilizing the control circuit to generate one or more corresponding images according to control parameters received from other electronic devices; and
    displaying the one or more images on a display of the target electronic device;
    wherein the performance indicators comprise at least one of the following messages:
    a processor computing power of the target electronic device;
    a total memory capacity of the target electronic device;
    a remaining memory capacity of the target electronic device;
    a remaining battery level of the target electronic device; and
    a next hop count of the target electronic device.

2. A computer program product, stored in a non-transitory storage device of a target electronic device, when executed by a control circuit of the target electronic device, enabling the target electronic device to conduct a multimedia generating operation, the multimedia generating operation comprising:
    utilizing a web browser module of the target electronic device to communicate the target electronic device with a central relay server via internet to conduct an identity authentication;
    utilizing the web browser module to transmit performance indicators of the target electronic device and an activation request to the CRS via internet, so that the CRS compares the performance indicators of the target electronic device with performance indicators of other electronic devices;
    utilizing the web browser module to receive an activation command from the CRS via internet if the target electronic device is assigned to be a local relay server (LRS) by the CRS;
    after receiving the activation command, utilizing a control circuit of the target electronic device to activate a websocket server module in the target electronic device to establish one or more network sockets between the target electronic device and other electronic devices, so that the target electronic device and other electronic devices communicate control parameters via the websocket server module;
    utilizing the control circuit to generate one or more corresponding images according to control parameters received from other electronic devices; and
    displaying the one or more images on a display of the target electronic device;
    wherein the performance indicators comprise at least one of the following messages:
    a processor computing power of the target electronic device;
    a total memory capacity of the target electronic device;
    a remaining memory capacity of the target electronic device;
    a remaining battery level of the target electronic device; and
    a next hop count of the target electronic device.

3. The computer program product of claim 2, wherein the multimedia generating operation comprises:
    utilizing the control circuit to evaluate network connection capability of other electronic devices; and
    utilizing the web browser module to transmit connection evaluation scores regarding other electronic devices to the CRS via internet.

* * * * *